(12) United States Patent
Linga et al.

(10) Patent No.: US 10,710,033 B2
(45) Date of Patent: *Jul. 14, 2020

(54) MULTI FLUID INJECTION MIXER

(71) Applicant: Produced Water Absorbents Inc., Houston, TX (US)

(72) Inventors: Harald Linga, Nesttun (NO); Finn P. Nilsen, Bergen (NO); Ronan Abiven, Paradis (NO); Bernt H. Kalgraff, Bergen (NO)

(73) Assignee: PRODUCED WATER ABSORBENTS, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/074,418

(22) Filed: Mar. 18, 2016

(65) Prior Publication Data

US 2017/0043306 A1 Feb. 16, 2017

Related U.S. Application Data

(63) Continuation of application No. 11/664,382, filed as application No. PCT/NO2005/000352 on Sep. 23, 2005, now Pat. No. 9,295,953.

(30) Foreign Application Priority Data

Oct. 1, 2004 (NO) .................................... 20044181
Nov. 8, 2004 (NO) .................................... 20044854

(51) Int. Cl.
*B01F 5/04* (2006.01)
*B01F 3/08* (2006.01)
(Continued)

(52) U.S. Cl.
CPC .......... *B01F 5/0451* (2013.01); *B01D 17/047* (2013.01); *B01F 3/0446* (2013.01);
(Continued)

(58) Field of Classification Search
CPC ............................ B01F 5/0451; B01F 5/0453
See application file for complete search history.

(56) References Cited

U.S. PATENT DOCUMENTS

| 4,664,147 A | 5/1987 | Maddock | 137/599.12 |
| 4,989,988 A | 2/1991 | Hutter et al. | 366/181.5 |

(Continued)

FOREIGN PATENT DOCUMENTS

| DE | 2508665 | 9/1976 |
| EP | 0300964 | 1/1989 |

(Continued)

OTHER PUBLICATIONS

International Search Report and Written Opinion issued in PCT/NO2005/000352, dated Jan. 24, 2006.
(Continued)

*Primary Examiner* — Elizabeth Insler
(74) *Attorney, Agent, or Firm* — Norton Rose Fulbright US LLP

(57) ABSTRACT

This disclosure includes mixers and methods of mixing. Some mixers comprise at least one contacting element, each defining at least one mixing channel. Each of the mixing channel(s) can have a cross-sectional area that decreases in a downstream direction to accelerate any pipe fluid flowing through the mixing channel. The contacting surface of each of the mixing channel(s) can deflect at least a portion of any pipe fluid flowing through the mixing channel until the contacting surface ends at an edge at a point of maximum constriction. Each of the contacting element(s) can define one or more injection path(s) to at least one of the contacting
(Continued)

Figure 2:
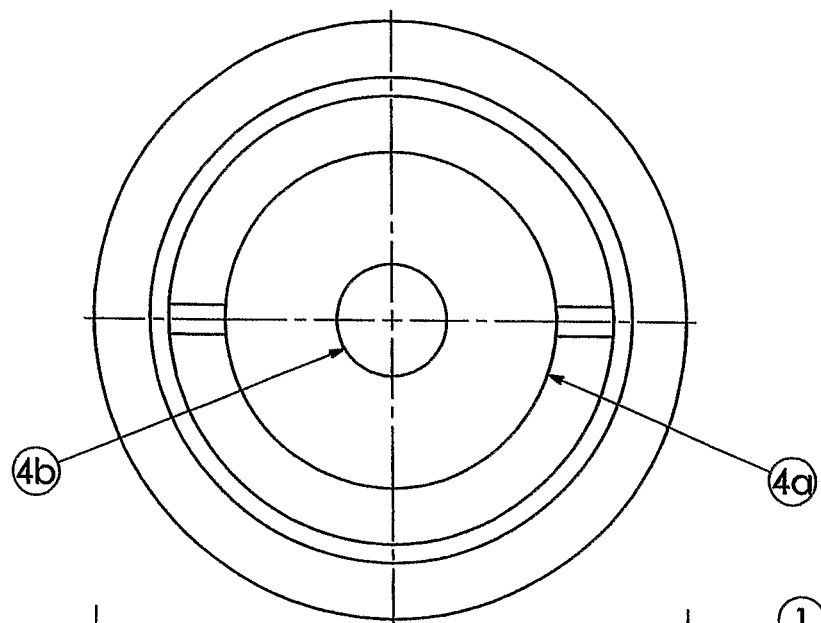

surface(s), each configured to inject admixture fluid onto the contacting surface such that the admixture fluid is entrained by pipe fluid over the edge.

13 Claims, 6 Drawing Sheets

(51) Int. Cl.
| | |
|---|---|
| *C02F 1/52* | (2006.01) |
| *C10G 33/04* | (2006.01) |
| *B01D 17/04* | (2006.01) |
| *C02F 1/68* | (2006.01) |
| *C10G 31/08* | (2006.01) |
| *B01F 3/04* | (2006.01) |
| *C02F 1/24* | (2006.01) |
| *B01F 5/06* | (2006.01) |
| *B01F 3/02* | (2006.01) |
| *C02F 103/10* | (2006.01) |

(52) U.S. Cl.
CPC .......... *B01F 3/0865* (2013.01); *B01F 5/0453* (2013.01); *B01F 5/0456* (2013.01); *B01F 5/0463* (2013.01); *B01F 5/0466* (2013.01); *B01F 5/0682* (2013.01); *B01F 5/0688* (2013.01); *C02F 1/24* (2013.01); *C02F 1/52* (2013.01); *C02F 1/683* (2013.01); *C02F 1/686* (2013.01); *C10G 31/08* (2013.01); *C10G 33/04* (2013.01); *B01F 3/02* (2013.01); *B01F 3/04* (2013.01); *B01F 3/0807* (2013.01); *B01F 2215/0032* (2013.01); *B01F 2215/0036* (2013.01); *B01F 2215/0052* (2013.01); *B01F 2215/0078* (2013.01); *B01F 2215/0086* (2013.01); *B01F 2215/0088* (2013.01); *C02F 2103/10* (2013.01)

(56) References Cited

U.S. PATENT DOCUMENTS

| | | | |
|---|---|---|---|
| 5,145,256 A * | 9/1992 | Wiemers | B01F 5/061 137/808 |
| 5,547,540 A | 8/1996 | Ruscheweyh | 159/4.08 |
| 5,590,961 A | 1/1997 | Rasmussen | 366/165.1 |
| 5,839,828 A | 11/1998 | Glanville | 366/340 |
| 5,971,604 A | 10/1999 | Linga et al. | 366/340 |
| 6,508,386 B2 | 1/2003 | Magri | 222/145.5 |
| 6,572,258 B1 | 6/2003 | Holland | 366/163.2 |

FOREIGN PATENT DOCUMENTS

| | | | | |
|---|---|---|---|---|
| GB | 1152194 A * | 5/1969 | | B01F 5/045 |
| WO | WO 02/00334 | 1/2002 | | |

OTHER PUBLICATIONS

Appeal against decision to refuse European Application No. 05792090.2, filed Feb. 6, 2017.
Decision of the Examining Division of the European Patent Office issued in European Application No. 05792090.2, dated Feb. 15, 2017.
Office Action issued in European Application No. 05792090.2, dated Jul. 25, 2017.
Response to Attend Oral Proceedings filed in European Application No. 05792090.2, dated Apr. 11, 2014.
Response to Office Action issued in European Application No. 05792090.2, dated Nov. 16, 2017.

* cited by examiner

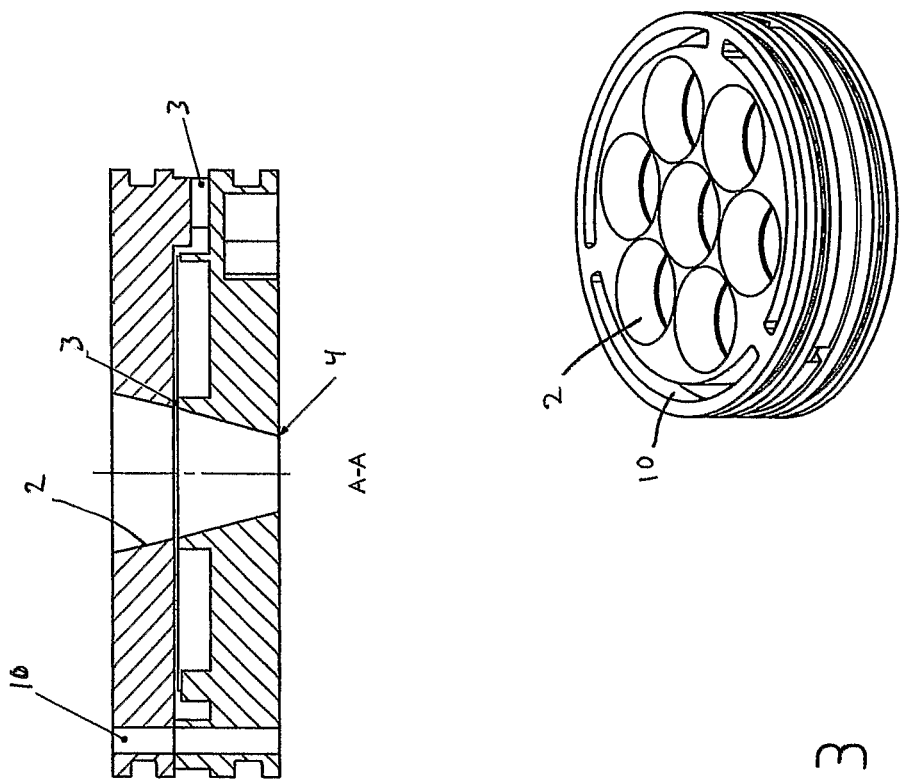
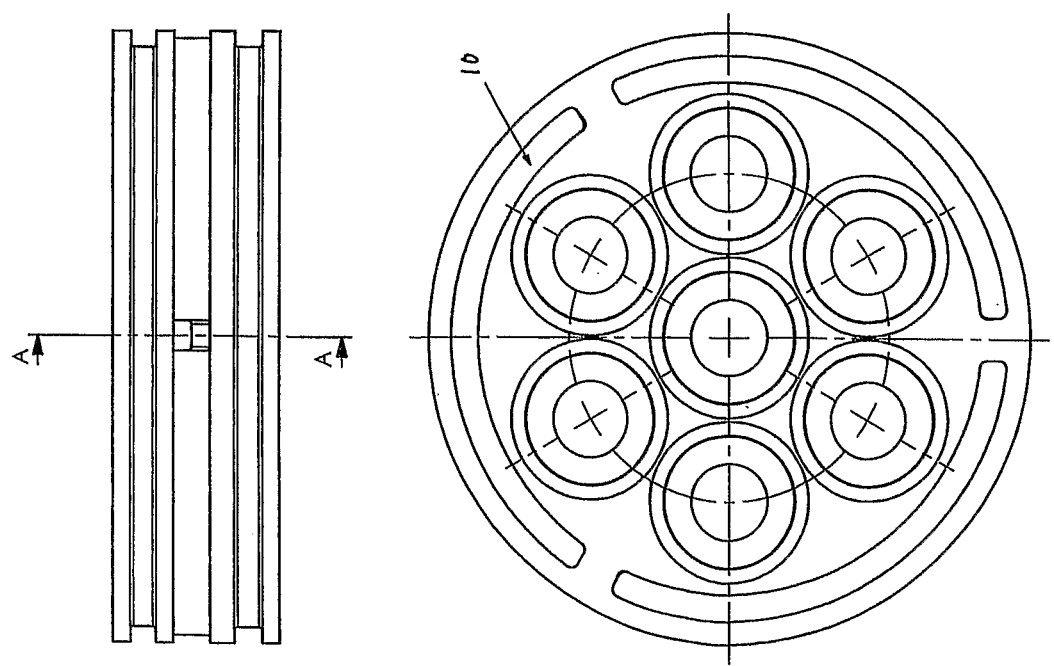
Fig. 3

MULTI FLUID INJECTION MIXER

CROSS REFERENCE TO RELATED APPLICATIONS

This application is a continuation of U.S. patent application Ser. No. 11/664,382 filed Apr. 9, 2009, which is a national phase application under 35 U.S.C. § 371 of International Application No. PCT/N02005/000352, filed Sep. 23, 2005, which claims priority to Norwegian Application No. 20044181, filed Oct. 1, 2004, and Norwegian Application No. 20044854 filed Nov. 8, 2004. The entire text of each of the above-referenced disclosures is specifically incorporated herein by reference without disclaimer.

FIELD OF THE INVENTION

The present invention relates to injection into, mixing and conditioning of fluids flowing through a pipeline. More particularly the invention relates to a multi fluid injection mixer, a mixer and an assembly including the multi fluid injection mixer, feasible for a large number of mixing, injection and conditioning operations, particularly related to processing hydrocarbons and in-line reactor processes for the production of fine chemicals.

BACKGROUND OF THE INVENTION AND OR ART

Processing of fluids is a large technical field finding applications in most industries. Processing of fluids flowing in a pipeline typically involves phase separation of the fluid contents and delivery of the separated constituents at a specified quality, according to subsequent use. For example the stream from a hydrocarbon well is separated into oil, gas and water, the phases being processed and cleaned for contaminants until a specification is met. The processing will typically involve injection of fluids such as chemicals, solvents or extraction fluids for enhancing the effect of the separation and processing equipment.

The most commonly injected fluids (admixtures) can be summarized as follows:

Scavengers/irreversible solvents (liquid for removal of sour constituents, such as eg. $H_2S$, Mercury, Mercaptans)

Corrosion inhibitors, Hydrate inhibitors, Scale inhibitors, Wax inhibitors

Drag reducers, Desalters, De-emulsifiers, Deoilers, Defoamers,

Antifoulants

Flocculants (enhancing the coalescence rate of the dispersed phase)

Condensate/hydrocarbon (extraction fluids)

Gas (flotation or alleviation of slugging)

Water (desalting or manipulation of the water cut of a multiphase flow mixture away from its critical value)

The respective admixture fluids are typically introduced into the flow of a pipe upstream of processing equipment, such as upstream of a separator. The flow can be any multiphase mixture of gas and one or more liquids, a single gas or a combination of gases, any liquid or mixture of miscible liquid components or immiscible components such as hydrocarbon liquid and water. Hence, the flow can be for example unprocessed well stream, produced water, processed oil-water flow, processed gas flow, produced water contaminated with dispersed and dissolved hydrocarbon, processed water flow contaminated with hydrocarbon liquid, or water subject to gas component removal (e.g. de-oxygenation). The range of surface tension, viscosity, pressure and temperature may vary considerably, and additional types of fluids or admixtures are also relevant.

Whereas the description above and below mainly relates to processing of hydrocarbons, the mixing of fluids is an essential unit operation also in other parts of the process industry, such as production of food (e.g. production of emulsion), pharmaceuticals, chemicals (reactive flow which may involve activators or reagents), paper (refining/treatment of pulp), melts (alloys) and other processes. These processes in general involve batch production using large vessels, where the different fluids are mixed by means of agitators. It is reason to believe that using pipe flow mixing instead of agitation in vessels is attractive both due to investment, operational costs, flexibility in production, safety and product quality.

Typically, the flow rate of the admixture injected into the pipe is extremely small as compared to the volumetric flow rate of for example a multiphase flow. The challenges with the feed of the admixture are therefore associated with obtaining a steady non-oscillating injection rate, safeguarding axial mixing and simultaneously achieving homogeneous dispersion and distribution of the admixture over the pipe cross-section of the multiphase flow in concern (radial mixing).

The resulting droplet size distribution of the dispersed injected admixture is affected by the mixer design, fluid properties and flow rates in concern.

Injection quills are the most common injection device for admixtures, but injection quills provide no effective distribution of the chemical into the multiphase flow. With requirement to achieve steady-state injection rate, also the turn-down in the flow rate of the admixture is limited. Nozzles normally provide better distribution than quills of the injected fluid into the continuous phase. Disadvantages are however associated with limitations in secondary break-up of droplets, narrow operational range of flow rate of the admixture (turn-down) and limited mechanical robustness. Also the scale-up towards higher pipe dimensions is questionable.

For the Sulzer mixer and similar static mixers the admixture is injected upstream of the mixer. The mixers are based on plates or baffles installed in series such that the multiphase flow is repeatedly exposed towards high shear forces in order to finally gain an acceptable mixture of the injected fluid and the continuous fluid phase. Typically this requires a considerable pressure drop (equivalent to high energy consumption, limitation in capacity or production rate) and long mixer installation units. Such mixers typically yield a fairly non-uniform droplet distribution of the injected admixture for practical lengths of the static mixers as only a part of the admixture is exposed to the high shear forces at the surface of the baffles or plates.

One-shot mixers such as chokes or ventures expose the inflowing multiphase flow towards a zone of high shear accomplished within a fairly short mixer. As for these mixers the injected fluid is pre-injected upstream of the mixer device, the injected fluid is entrained with the bulk of the continuous phase. Accordingly the injected fluid is in general not exposed to the part of the mixer where the shear forces are high; the vicinity of the mixer wall. In order to compensate for this and secure the break-up of the injected fluid (as associated with stretching of "fluid elements" in regions of high shear; large gradient in fluid velocity), a high pressure drop over the mixer needs to be imposed.

The Westfall Manufacturing Company of Bristol, R.I., USA offers a static mixer which is adapted for disposition in a pipe containing fluid flow, the static mixer including a circumferential flange radially inwardly extending from the internal pipe surface and in turn having at least a pair of opposed flaps extending there from and inclined in the direction of the fluid flow. Said static mixer is described in patent publication U.S. Pat. No. 5,839,828, to which document reference is made. Operation of the static mixer results in a combination of laminar and turbulent flow column 1, line 36-39). Further, chemicals can be added through injection ports on the downstream side of the flaps (claim 4, FIGS. 10 and 7, column 3 line 21-33 and 59-62). In this device the chemical is point injected behind a plate, namely a flap, and not injected such that the chemical is homogeneously distributed in the continuous phase. There is no description of any sharp edge.

By the invention of the ProPure injection mixer designated C100, as described in patent application EP 01947618.3, the technology for mixing and injection was advanced. The injection mixer C100 consists of a contacting element formed as a contracting pipe through which a gas stream flows, and an injection element consisting of a liquid inlet configured to produce an annulus of liquid around the internal perimeter of the contracting pipe, a sharp edge at the end of the contracting pipe and a further pipe section downstream of the sharp edge. Preferably the downstream pipe section is a diverging pipe to recover some of the pressure dropped over the contracting section. In patent application EP 01947618.3 it is described how the injection mixer C100 can be used for distributing a liquid into a gas stream, for absorbing a selected gas component from a gas stream by bringing the gas stream into contact with a liquid including a solvent or a reagent for the selected gas component, for scavenging $H_2S$ from natural gas, for selectively removing $H_2S$ from a natural gas in preference to $CO_2$, for simultaneously removing acid gas components from a natural gas stream, for deoxygenizing water, for dehydrating natural gas, and how it is used in combination with existing columns to adapt an existing plant to accommodate a change in the feed conditions. Additionally it is described how the injection mixer can be used as a mixer for remixing the phases in a fluid flow, without injection of chemicals. It is also described how several injection mixers can be combined in series or in parallel to inject several liquids, by injecting one chemical in each mixer (cf. claims 15, 16, FIGS. 10a and 10b of EP 01947618.3). Injection of several admixture fluids in one injection mixer is not considered in EP 01947618.3, probably because injection of several admixture fluids simultaneously is considered inefficient. For example, injection of a gas together with a viscous liquid is considered inefficient since the admixture fluids are not expected to mix intimately because of the large difference in fluid properties as density, surface tension and viscosity. This, combined with flow rate in concern and resulting pressure gradient over the injection conduit in concern, may serve to cause oscillating injection flow rates for at least one of the injected admixture fluids. Based on the teaching of EP 01947618.3 the person of ordinary skill in the art will only consider injection of liquid into a gas flow, only one injection element will be considered and only a contacting element formed as a contracting pipe will be considered, as there is no indications of different embodiments or the possibilities for improved technical effect.

Despite the advantageous properties of the C100 injection mixer, a demand exists for technology simplifying injection several chemicals or admixtures with one injection mixer, thus reducing the pressure drop and the number of injection mixers. A demand also exists for improved technical effect over the C100 injection mixer with respect to mixing of the admixture fluid, particularly with multi fluid injection, deposition of the admixture on the internal pipe wall, and also alternative constructions of an injection mixer, which can prove to be advantageous for specific applications, such as modifying existing equipment to improve the technical effect. A demand exists for an injection mixer with a steady, non-oscillating, minimized admixture injection rate (axial mixing) and homogeneous dispersion and distribution of the chemical into the fluid phases (radial mixing), over a wide range of flow conditions, with a narrow range of droplet/bubble sizes, at low pressure drop and low admixture deposition rate. A demand also exists for a mixer for homogenously mixing of fluids flowing in a pipe. A further demand exists for an assembly of an injection mixer with additional equipment, particularly feasible for treatment of produced water, treatment of oil, desalting and flow assurance.

SUMMARY OF THE INVENTION

The above-mentioned demands are met with the present invention, by providing a multi fluid injection mixer for injecting gas and/or liquid as admixture fluid to gas and/or liquid flowing through a pipe, and homogeneously mixing the admixture fluids and pipe fluids, said injection mixer constituting a section of the pipe.

The multi fluid injection mixer is distinguished by comprising:

at least one contacting element having at least one contacting surface facing and deflecting some of the pipe fluid flow, forming a constriction to the internal cross-section of the pipe, such that the pipe fluid flow is accelerated and fluid flowing in the vicinity of said surface is deflected to flow along the surface until the surface end over a sharp edge at the point of maximum constriction and flow velocity, at least one injection element arranged with a fluid connection to said surface of the contacting element, such that admixture fluid can be injected onto said surface and along said surface be entrained by the flowing pipe fluid over the sharp edge, but for a contacting element formed as a contracting pipe section at least two injection elements are provided.

Preferably the contacting element is formed as a coaxial to the pipe axis located inverse cone, as this provides a favorable technical effect, particularly with respect to deposition of admixture fluid on the internal pipe surface. An inverse cone formed contacting element has the sharp edge at the base of the cone, i.e. the widest part of the cone. A cone section formed contacting element has the sharp edge at the narrow base of the cone, i.e. the narrow or crusted part of the cone.

Preferably the contacting element comprises several cone sections, arranged over the cross section of the pipe, for example 7 cone sections, which results in increased sharp edge length relative to the cross section of the pipe, and thereby a favorable technical effect, particularly for larger pipe dimensions. Similarly the contacting element may favorably comprise several inverse cones or inverse cone sections, arranged over the cross section of the pipe, for example side-by-side.

Preferably the contacting element is formed as one or several inverse cone cross-section rings, which means at least one ring-formed contacting element where a cross section along the radius is formed as an inverse cone with two deflecting surfaces. Further, the contacting element may comprise combinations of the above mentioned embodiments, such as one coaxial to the pipe axis located inverse cone and at least one inverse cone cross-section ring.

Preferably at least one passageway for pipe fluid flow along the internal pipe wall, bypassing the contacting element, is provided, which results in pipe fluid flow along the internal pipe wall reducing the admixture deposition on the internal pipe wall.

Preferably the contacting element is assembled from interchangeable parts, allowing for adaptation of the form of the contacting element to the prevailing conditions, preferably adaptable such that homogenous mixing is achievable over the full pipe cross section at any relevant condition of flow. Further, the contacting element preferably includes a suspension having spring action, such that increased pipe flow rate results in increased opening for admixture and flow rate of admixture, thus providing a self regulating injection rate of admixture. The contacting element and the injection element are preferably integrated as one unit.

Preferably the injection element comprises a channel or apertures for injecting admixture fluid evenly over the deflecting surface of the contacting element, upstream of the sharp edge, one injection element is preferably arranged for each intended admixture fluid, and injection elements for gases are preferably arranged upstream of injection elements for liquids. Further, the injection elements are preferably adjustable with respect to apertures and pressure for flow rate of admixture fluid of any type or mixture of admixture fluids.

Diverging pipe sections or elements are preferably arranged downstream of contacting element, to provide a controlled volume of turbulence and approach to the pipe pressure and flow velocity, by bringing the flow cross section gradually back to the pipe cross section. However, the technical effect is favorable also when connecting the multi fluid injection mixer directly to the downstream pipe or connection. Hence, a diverging pipe or a similar element is not obligatory, which is surprising in view of patent application EP 01947618.3.

The invention also provides a mixer for homogenous mixing of fluids flowing through a pipe, said mixer constituting a section of the pipe, distinguished in that the mixer is comprising:

at least one contacting element having at least one surface facing and deflecting some of the pipe fluid flow, forming a constriction to the internal cross-section of the pipe, such that the pipe fluid flow is accelerated and fluid flowing in the vicinity of said surface is deflected to flow along the surface until the surface end over a sharp edge at the point of maximum constriction and flow velocity. The mixer preferably includes at least one of the features mentioned above relating to the contacting element.

The invention also provides an assembly, distinguished in that it is comprising a multi fluid injection mixer according to the invention, a pipe section connected in a first end to the outlet of the injection mixer and a re-mixer according to U.S. Pat. No. 5,971,604, connected to a second end of the pipe.

With the phrase the injection mixer constituting a section of the pipe it is meant that the injection mixer is inserted as a section in the pipe, or inserted at the beginning or end of the pipe, such that the pipe fluids flow through the injection mixer. The term homogenously mixing means in this context intimately mixing, preferably over the full cross section of the pipe, with the admixture fluids uniformly distributed as droplets or bubbles of very small size, typically of a size measured in microns. The term a sharp edge means in this context a slip edge where the injected fluids slip from the internal surface, breaking up into filaments. Subsequently the filaments are broken up into small droplets or bubbles. The sharp edge will usually form an acute angle. The phrase that the sharp edge is located at the point of maximum constriction and flow velocity, implies that the sharp edge is at the downstream and most constricted end of the internal surface, related to the flow direction along the internal surface, and that the cross section for the fluid flow immediately further downstream of the sharp edge is somewhat expanded. A stagnant volume is thus formed leeward of the sharp edge, which stagnant volume is essential for creating a section of intense turbulence considered crucial for homogenously mixing of the admixture fluids and pipe fluids.

Surprisingly it is now possible to inject more than one admixture fluid of any type in one single injection mixer, with one ore more injection elements, even if one admixture fluid is a very viscous liquid and another admixture fluid is a gas. Surprisingly the technical effect can be achieved also with other forms of the contacting element than a contracting pipe, and some embodiments provide a significant improvement of the technical effect, while other embodiments may open up for modifications of existing equipment to improve the technical effect.

In its simplest embodiment the multi fluid injection mixer of the invention can comprise one baffle plate or a flap, including one injection element with point injection of admixture fluid onto the internal surface of the baffle plate or flap, which embodiment under many conditions can be preferable to prior art injection mixers.

The contacting element is most preferably formed as one or more inverse cones or inverse cone cross-section rings, which is considered most preferable to achieve homogenous mixing over the full pipe cross section, with the lowest flow rate of admixture fluids, over the widest range of prevailing conditions and lowest deposition rate. Preferably the stagnant zones leeward of sharp slip edges do not extend to the internal pipe wall for the full pipe circumference, most preferably they do not extend to the internal pipe wall at all, as this reduces the deposition rate. To this end, the contacting element deflects the pipe flow away from the internal pipe wall over a part of the pipe circumference at maximum.

Alternatively the contacting element is formed as a plate with at least one opening, as a gutter ring, or as one or more baffle plates or flaps. The embodiment of the contacting element formed as a baffle plate includes modifications of prior art mixers with injection elements incorporated, for example Sulzer mixers with at least one injection element included in at least one baffle plate, or a choke with an injection element included in the choking surface, or the Westfall static mixer with injection onto at least one flap.

One injection element is preferably arranged for each intended admixture fluid, on each contacting element, and injection elements for gases are preferably arranged upstream of injection elements for liquids, as this has proved to be effective. Miscible admixture fluids can be injected through one injection element. Admixture fluids forming the more stable film flow, usually the more viscous admixtures, are in general injected closer to the sharp edge than admixture fluids forming less stable filaments or films.

The invention also provides a mixer for homogeneously mixing of fluids flowing through a pipe, said mixer constituting a section of the pipe, said mixer being identical to the injection mixer except that the injection elements are omitted.

An assembly is also provided by the invention, distinguished in that it is comprising an injection mixer according to the present invention, a pipe section connected in a first end to the outlet of the injection mixer and a re-mixer in accordance to patent U.S. Pat. No. 5,971,604, connected to a second end of the pipe.

DRAWINGS

Figure 1:
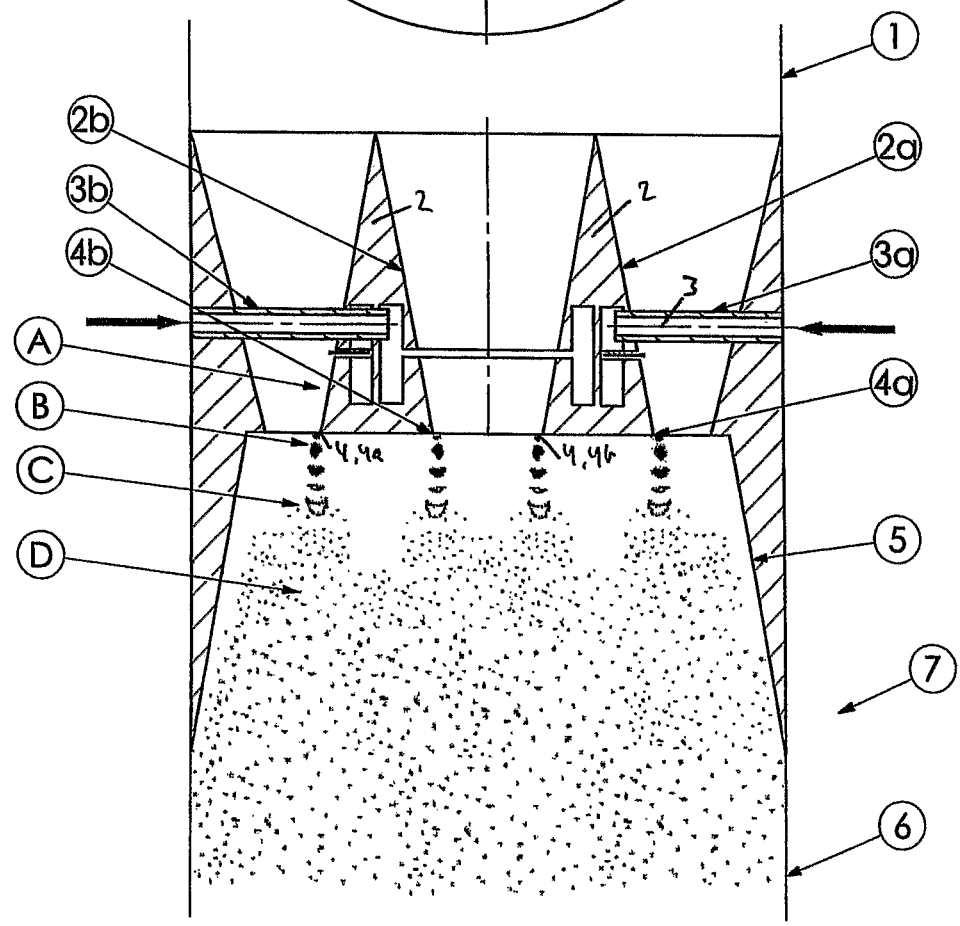
Figure 4:
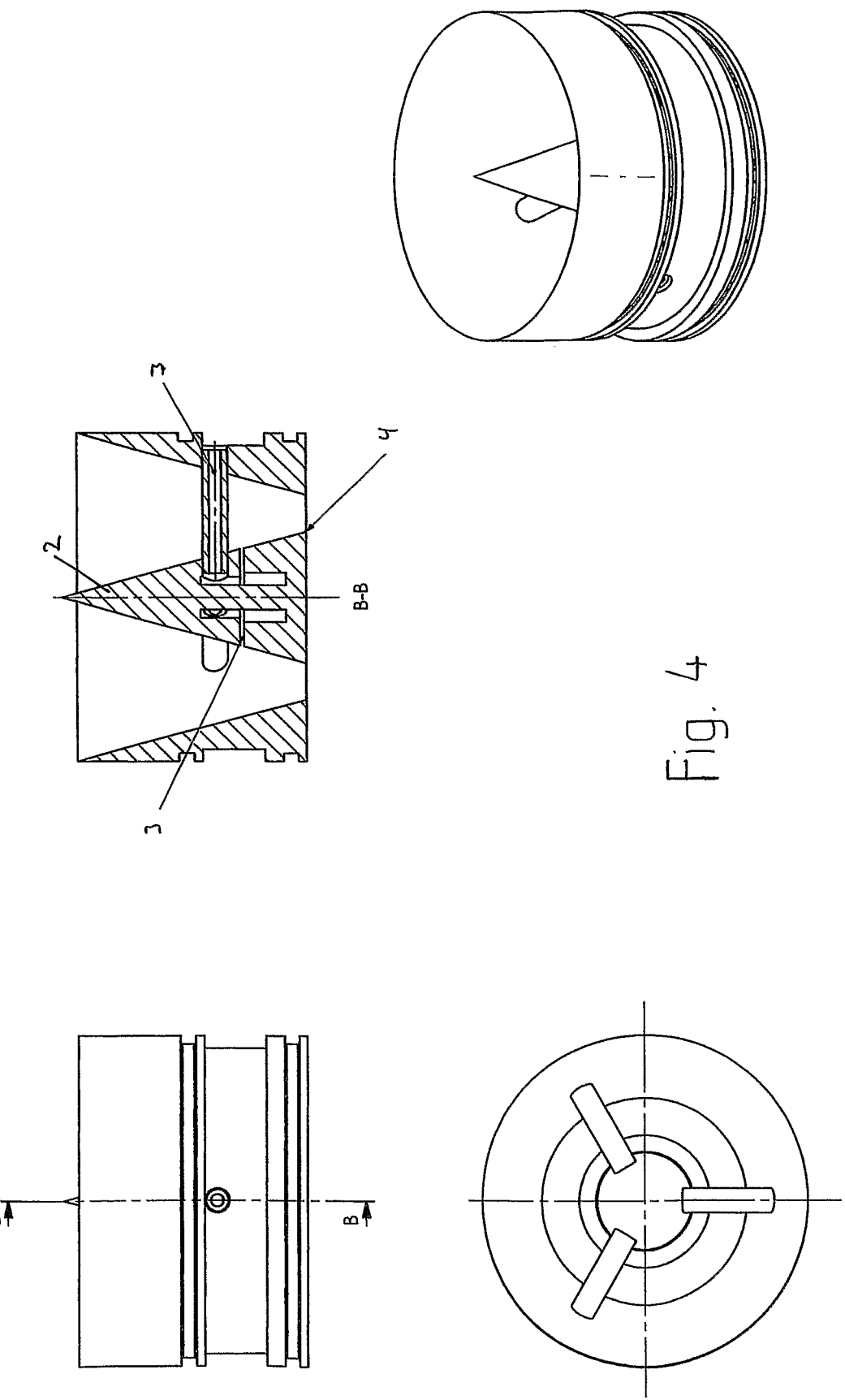
Figure 5:
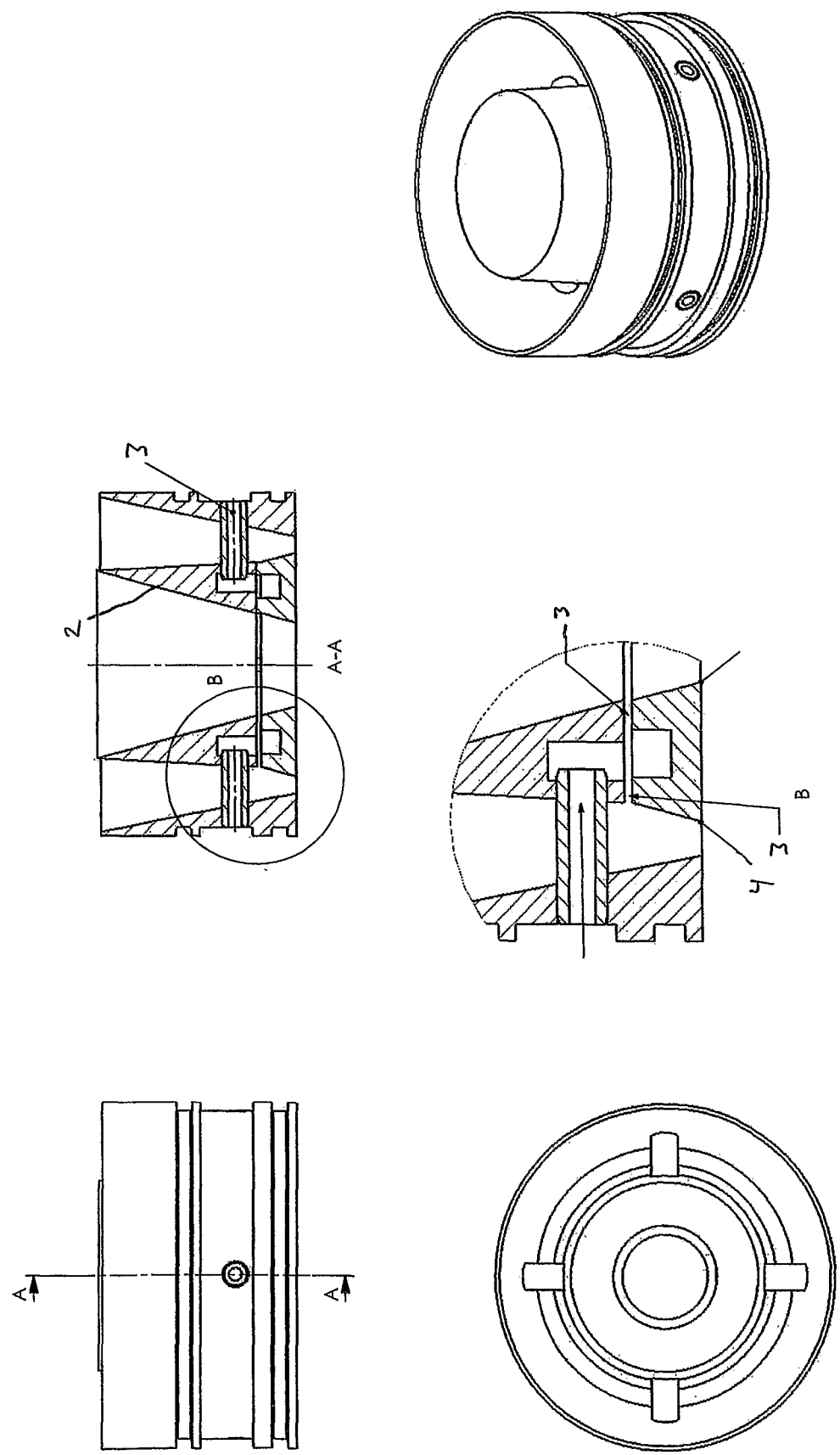
Figure 6:
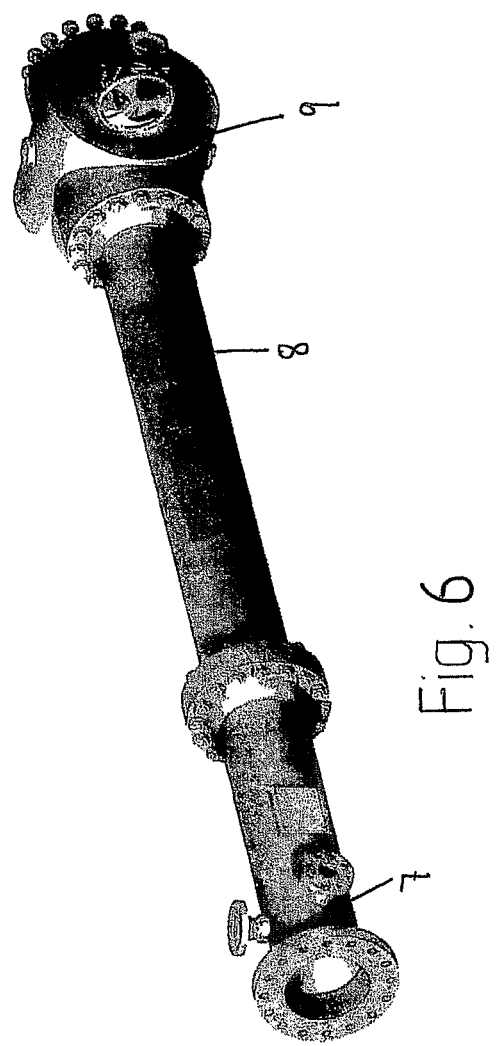

The present invention is illustrated with drawings, of which:

FIG. 1 is a cross-section along the longitudinal axis of a multi fluid injection mixer according to the present invention, namely an inverse cone ring mixer, FIG. 2 is a view from below of the mixer of FIG. 1, FIG. 3 is a multi fluid injection mixer according to the present invention, having 7 cone formed contacting elements, FIG. 4 is a multi fluid injection mixer according to the present invention, where the contacting element is formed as an inverse cone, FIG. 5 is an inverse cone ring mixer according to the present invention, and FIG. 6 illustrates an assembly according to the present invention.

Figure 7:
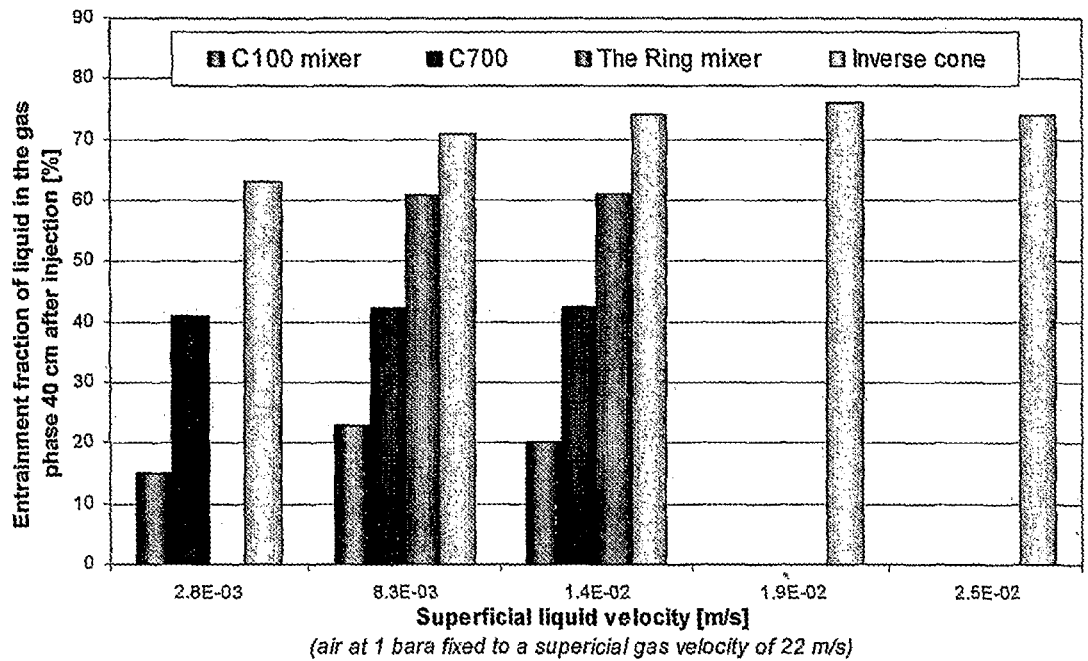
Figure 8:
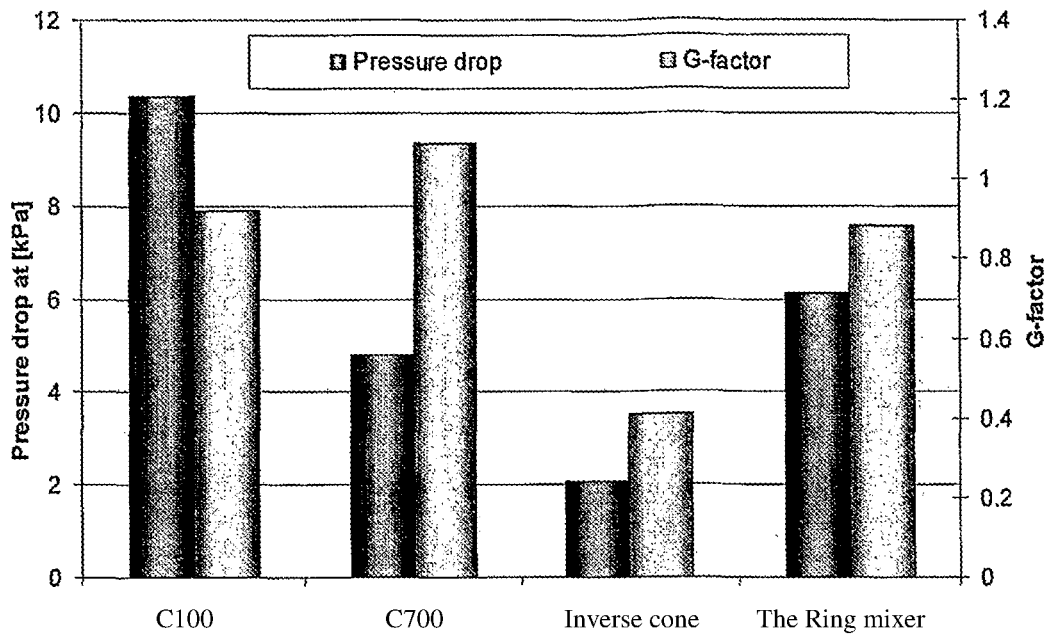

FIG. 7 and FIG. 8 show some typical parameters where three embodiments of the invention are compared with the C100 mixer.

DETAILED DESCRIPTION

Reference is first made to FIG. 1, illustrating in longitudinal cross-section a multi fluid injection mixer 7 according to the present invention, which injection mixer includes a contacting element (2, 2a, 2b) formed as an inverse cone ring, i.e. the cross-section of the contacting element, along the radius of the ring, is an inverse cone. The inlet pipe 1 conducts fluid to be processed to the mixer. The contacting element 2, formed as an inverse cone ring with inner 2b and outer 2a contacting surfaces, accelerates the fluids of the pipe continuously towards a prescribed maximum velocity and dynamic pressure. The diameter of the outlet of the contacting surfaces is determined by the dynamic pressure/drag force required to tear off the injected fluids efficiently at a sharp edge (4, 4a, 4b) at the outlet. The injection elements 3a and 3b are used for injection of admixture fluids to form a liquid/gas bubble film on the inner contacting surfaces. The injection elements include a chamber or ring conduit from which the injected fluids are guided to the contacting surfaces via a continuous channel. The diameter and length (depth) of the channel, both preferably adjustable, are calculated by the liquid/gas fluid properties and liquid/gas admixture injection flow rate so that the pressure drop over the circular channel normally exceeds the difference in gravity head over the periphery for a horizontally mounted mixer. At the downstream end of the contacting element the sharp edges 4a and 4b are situated, one for each contacting surface, preferably sharp edges having angle lower than 90°, designed so that the liquid/gas bubble film is accelerated by the drag exerted by the fluid contents and is torn into liquid/gas bubble filaments in the downstream volume rather than "creeping" at the pipe wall to the downstream side. An expanding element 5, formed as a diverging pipe, is arranged downstream to the contacting element and sharp edge, for deceleration towards the normal pipe flow velocity. The angle and length of the expanding element is particularly important for the turbulence generation and permanent pressure drop over the injection mixer. The outlet pipe 6 guides the processed fluid mixture further. As illustrated in the figure by the size and distribution of the droplets/bubbles in the outlet pipe 6, droplets and gas bubbles are broken up into extremely small sizes and distributed very uniformly over the foil cross-section of the pipe. The size of the droplets/bubbles can be as small as a few microns.

The embodiment illustrated in FIG. 1, formed as a inverse cone ring, includes two contacting surfaces, namely one on each side of the inverse cone, with one injection element for admixture injection for each contacting surface. The sharp edges are located at 4a and 4b, respectively, formed as sharp edge rings. FIG. 2 illustrates the multi fluid injection mixer of FIG. 1, as viewed from below, i.e. from the downstream side. The sharp edges 4a and 4b are indicated. The embodiment illustrated on FIGS. 1 and 2 is very favorable with respect to mixing and deposition, which means that the injected admixture fluids are very uniformly mixed for a long section downstream without being deposited on the internal pipe wall.

Many alternative geometries are possible, of which a few preferable ones are illustrated.

FIG. 3 illustrates a multi fluid injection mixer called C700, with 7 cone section formed contacting elements. Said injection mixer provides a large contacting surface area and a large length of sharp edge, i.e. slip edge, relative to the cross-section of the pipe. Further, three pipe fluid bypass openings 10 along the internal pipe wall are provided, resulting in a pipe fluid "curtain" along the internal pipe wall, decreasing the admixture deposition on the internal pipe wall. Therefore the technical effect is favorable.

A different embodiment can be seen on FIG. 4, which illustrates an inverse cone mixer, where the inverse cone is located coaxial to the pipe axis. The volume of turbulence is located downstream and leeward of the inverse cone, which means away from the internal pipe wall, resulting in a low deposition rate of the injected admixture fluids.

FIG. 5 illustrates an embodiment of the multi fluid injection mixture of the present invention, designated a ring mixer, which mixer is an embodiment of the inverse cone ring mixer illustrated on FIGS. 1 and 2, providing a quite similar technical effect. The deflection of the pipe fluid flow increases close to the sharp edge, which can be beneficial.

The contacting element could alternatively be formed as a flange with at least one opening, preferably one opening coaxial with the pipe flow, or an internal gutter around the periphery of the pipe. With a contacting element formed as a cone section the injected fluids or admixtures flow co-currently with the fluid of the pipe. With a contacting element formed as flange or similarly the injected fluids flow laterally or cross-currently to the general direction of flow through the pipe. With a contacting element formed as a gutter, the injected fluid flows at least partly countercurrently to the main flow direction of the pipe. The contacting element embodiments resulting in at least partial cross current flow or counter current flow of the injected admixture fluids will have a more stagnant area on the surface nearest the pipe wall, in which more stagnant area a thicker film of injected liquids/gas bubbles can be accumulated for being entrained by slugs or increased flow rates. Also the orientation of the conduit relative to the direction of the main flow or the surface area towards the multiphase pipe flow will affect the local boundary condition in terms of the pressure at the outlet of the admixture fluid conduit. Thus when the flow momentum of the multiphase flow is increased, the suction as caused by increased dynamic pressure will serve to increase the flow rate of the admixture fluid to some proportion. Thus, a sort of self regulating is achieved, which can be beneficial for fluctuating pipe flow conditions. Further, the degree of constriction can be different.

As a further explanation and with reference to FIG. 1, without wishing to be bound by theory, the droplet generation sequence can be divided into four stages, of which A designates that initially an annular film of the injected fluid is exposed to accelerating pipe fluid flow. At B, the special sharp edge geometry favors the generation of filaments of the injected fluids into the continuous flow. At C, the filaments of the injected fluid are broken up into small droplets. The breaking up is determined by the Weber number (We-number) as calculated from the surface tension σ between the pipe fluid phase and the injected fluid, the characteristic filament dimension d, the relative velocity U and the density ρ of the continuous phase (ref. Krzeczkowski, 1980):

$$We = \rho \cdot U^2 \cdot d / \sigma$$

Break-up corresponds to $We > We_{er}$. For wind tunnel experiments and droplet injection into the flow field. $We_{er}$ has been determined to be 8-10. At D radial droplet mixing takes place, determined by the initial break-up of the filament droplets and the local turbulence, as represented by the local Reynolds number of the pipe flow.

It is important to control the injection pressure and injection rate such that admixture fluids are injected onto the internal contacting surfaces rather than into the pipe flow, and such that pipe fluids do not flow into the injection equipment.

Reference is made to FIG. 6 that is an illustration of an assembly according to the present invention. More specifically the assembly comprises the multi fluid injection mixer 7 of the invention arranged with a pipe section 8 and a re-mixer 9. The re-mixer is in accordance to description of patent publication U.S. Pat. No. 5,971,604. More specifically, the re-mixer comprises a housing to be inserted in the pipe for the fluid to flow through, and in the housing there are at least one and preferably two or more adjoining and individually displaceable sealingly arranged regulating elements having cooperating wall portions with flow passages. The regulating elements can be adjusted for the flow passages to be focused at one point in a central chamber, or to be misaligned, with respect to inlet passages and outlet passages from the central chamber, thereby controlling the flow and mixing action. For further details, please refer to U.S. Pat. No. 5,971,604. The assembly is particularly useful for processing of produced water, to reduce the contamination of oil.

EXAMPLE 1

Treatment of Produced Water

An assembly according to FIG. 6 was used to reduce the contents of oil in produced water. The injection mixer had an injection element formed as a cone section. The re-mixer was according to claim 2 of U.S. Pat. No. 5,971,604. Two admixture fluids were injected, namely nitrogen gas upstream of a liquid flocculant. Nitrogen can be replaced partially or completely by natural gas. The pipe length was in the range 0.1-30 m. The actual volumetric flow rates were in general as follows:
Produced water: $Q_w$
Nitrogen gas: $Q_w \cdot 10^{-2}$
Flocculant: $Q_w \cdot 10^{-5}$ With corresponding flow rates an equally good or better performance can be achieved with respect to oil contents in the downstream separated produced water compared to an injection arrangement of two C100 injection mixers in series, at 50% of the pressure drop, or compared with an injection arrangement of flocculant injected in a quill or nozzle upstream a C100 injection mixer used for gas injection. The pressure drop was in the range 0.02-2 bar depending on the pipe flow conditions. The injected gas provided a flotation effect. The re-mixer maintained the flotation effect of the gas bubbles and the uniform distribution of the flocculent and gas bubbles over the full cross section of the pipe.

A distance downstream of the re-mixer equipment for separation of oil from water is installed, for example a hydrocyclone, which has proved to be efficient for the separation of oil from water flow including gas bubbles and coalesced oil droplets. The re-mixer is adjustable with respect to mixing action and can be operated such that operation of downstream separation equipment is efficient, even at somewhat varying pipe flow rate, as far as the variations can be compensated for by regulating the mixing action of the re-mixer. The re-mixer can be replaced by a mixer according to the invention or an injection mixer of the invention or the C100 injection mixer, the injection mixers without injection of further chemicals but merely operating as a mixer, or alternatively with further injection of admixtures. However, the assembly of the invention, with the injection mixer and re-mixer connected via a pipe section, provides a technical effect for treatment of produced water as yet unknown. It is assumed, without wishing to be bound by theory, that the injection mixer arrangement with the conduit of gas followed by the conduit of flocculant serves to change the velocity profile and the wall shear stress exposed to the injected flocculant. The gas is immediately dispersed into small bubbles and locally increase the flow velocity of the multiphase flow in the vinciniry of the wall of the injection part of the mixer. This serves to increase the velocity gradient and hence also the shear stress as imposed to the injected flocculant. As result an efficient homogeneous dispersion of the flocculant is generated. This is particularly important if the residence time of the flocculant prior to separation is limited.

EXAMPLE 2

Treatment of Oil

This example relates to use of the assembly of the invention in a method for treatment of oil. Conventional oil-water treating is normally carried out in large horizontal vessels to allow for gravity settling of the water droplets. In the treatment of heavy oil systems it is normally required to apply considerable amounts of demulsifying chemical to effectively disengage water from oil to meet required product specification of less than 0.5% BS&W volume fraction Basic Sediment and Water). The demulsifier is a surface active compound that competes with the natural surfactants in the oil to displace them from the oil-water interface. Thus the interfacial film around droplets can be disrupted to facilitate droplet-droplet coalescence.

With the use of prior art equipment such as injection nozzles and injection quills, it is very difficult to make sure that the demulsifying agent arrives at the droplet surfaces that are dispersed in the continuous oil stream. Thus overdosing of chemical can become a problem—instead of destabilizing an emulsion, a new emulsion can be formed, resulting in malfunction of the oil-water separator.

It is known that recirculation of produced water can enhance separator performance due to increase in critical water cut and the possible phase inversion to a water continuous system. Using the dual injection function of the injection mixer, the recirculated produced water and demulsifying agent can be injected upstream of the production separator. Once water with demulsifying agent is injected and mixed homogeneously in the continuous phase, the re-mixer according to U.S. Pat. No. 5,971,604, is used to create new surface area for droplet-droplet coalescence. With careful re-mixing of the injected chemical, recirculated water and the multiphase flow to be treated, the demulsifying chemical can reach the new surface area of the droplets and immediate and effective water droplet coalescence can commence. In fact such effective mixing of demulsifying agent and following coalescence of water droplets can reduce the water content in the oil with at least 35% in comparison with conventional systems. Alternatively, 20% less demulsifying chemical can be applied to the process and still yield the specification of 0.5% BS&W.

EXAMPLE 3

Desalting

This example relates to use of the assembly of the invention in a method for desalting crude oil. Crude oil often contains water, inorganic salts, suspended solids, and water-soluble trace metals. As a first step in the refining process, to reduce corrosion, plugging, and fouling of equipment and to prevent poisoning the catalysts in processing units, these contaminants must be removed by means of desalting, comprising admixture injection, including water, multiphase flow mixing and downstream separation.

The two most typical methods of crude-oil desalting, based on chemical and electrostatic separation, use hot water as the extraction agent. In chemical desalting, water and chemical surfactant (demulsifiers) are added to the crude, heated so that salts and other impurities dissolve into the water or attach to the water, and are then routed into a tank where they settle out. Electrical desalting is the application of high-voltage electrostatic charges to concentrate suspended water droplets in the bottom of the settling tank. Practical process implementation for desalting might also include the combination of these methodologies.

Prior art equipment for the injection/mixing of injection of water/demulsifying agent can be the combination of injection quill with downstream Sulzer mixer or choke valve.

The use of the assembly of the invention will safeguard the effective and homogeneous distribution of warm water and demulsifier such that optimum surface area is created for the salt to be extracted from the oil into the injected water. In can be expected that efficiency for the process will be improved both in terms of amount of demulsifier necessary for achieving a specified quality, the pressure drop required for the process and the volumetric handling capacity of the desalting process.

EXAMPLE 4

Flow Assurance

This example relates to use of the assembly of the invention in a method for flow assurance. Flow Assurance includes all issues important to maintaining the flow of oil & gas from the reservoir to the reception facilities. Potential pipeline blockage issues can be related to hydrates, wax, asphaltenes, scale or sand.

The formation of hydrates is a major operational and safety problem which can occur unpredictably in subsea pipelines and well head facilities. Gas hydrates can potentially be formed in subsea flowlines unless the water content is removed to below the lowest dew point encountered. Typically precautions are pipeline insulation, heating and/or inhibitors. The conventional approach to inhibition of hydrates is the injection of methanol or glycol in the pipeline. In this way the hydrate formation occurrence line is shifted towards lower temperatures for the pressure level in concern.

With use of the assembly of the invention, methanol together with a irreversible reacting triazine chemical is injected in the pipeline to simultaneously remove highly corrosive $H_2S$ and to prevent the formation of hydrates. The triazine based chemical forming more stable film or filaments is injected through the injection element of the multiple injection mixer closest to the sharp edge whereas the methanol or glycol is injected through the injection element most remote from the sharp edge. By this also the velocity profile of the pipe flow is affected such that the shear stress at the surface area towards the sharp edge is increased. As a consequence a more efficient deformation of the filaments and generation of secondary droplet break-up of triazine results as compared to no immediate injection of methanol upstream the injection of triazine.

EXAMPLE 5

Comparisons with C100

Surprisingly, the preferred embodiments of the multi fluid injection mixers of the present invention utilize the turbulence generated by the sharp slip edge to distribute and maintain the droplets in a gas phase, and probably similar for any pipe fluid phase, for a longer time than the C100. By changing the geometry which defines the contacting element and slip edge, the turbulence surprisingly helps to keep the droplets in the gas phase. The new geometries allow the gas to flow over the sharp slip edge, as well as generating a gas curtain between the wall and the sharp slip edges. This serves to reduce the droplet deposition rate as compared to the C100.

FIG. 7 and FIG. 8 show some typical parameters where three embodiments of the invention are compared with the C100 mixer.

FIG. 7 shows the fraction of the total liquid flux (admixture fluid) flowing with the gas phase (pipe fluid) at the position 40 cm after the injection point. The rest of the liquid is flowing as liquid film on the pipe wall. As can be seen from the table, significant improvement has been achieved with the present invention in terms of entrainment fraction at the downstream position.

FIG. 8 shows the pressure drop recorded when the mixer was tested with air at 1 bara and a superficial velocity of 22 m/s. The table also shows the G-factor which characterizes the geometry in an aerodynamic point of view. It is advantageous to have G as low as possible as this represents a potential for low permanent pressure drop over the mixer unit.

The tested embodiments are illustrated on the drawings as follows:

FIG. 3 illustrates an injection mixer C700, with 7 cones (contacting elements) and 3 passageways for fluid along the pipewall (pipe fluid bypass openings 10), FIG. 4 illustrates an inverse cone mixer, and FIG. 5 (and FIGS. 1 and 2 also) illustrates an inverse cone ring mixer, which mixer sometimes is called a ring mixer.

The multi fluid injection mixer, the mixer and the assembly according to the present invention can in principle be used in any industry where mixing, injection and fluid conditioning can be undertaken in a pipe containing flowing fluids.

The invention claimed is:

1. An injection mixer for injecting and homogeneously mixing at least one injected fluid with a pipe fluid, the injection mixer extending between an inlet and an outlet, each configured to be coupled to a pipe, and comprising at least one contacting element, each contacting element(s):
    having one or more contacting surfaces, that each:
        extends between a first end of the contacting element and a second end of the contacting element, an edge being defined at the second end of the contacting element;
        defines a mixing channel through the contacting element; and
        converges such that the cross-sectional area of the mixing channel decreases from the first end of the contacting element to the second end of the contacting element to define a minimum cross-sectional flow area of the mixer at the second end; and
    defining at least one injection path through a portion of the contacting element to and through at least one of the contacting surface(s) such that, when the pipe fluid flows in the mixing channel from the first end to the second end, the injection path is configured to inject admixture fluid onto the contacting surface such that the pipe fluid entrains the admixture fluid along the contacting surface and over the edge;
    where at least one of the injection path(s) is configured to inject a first admixture fluid that comprises a hydrate inhibitor; and
    where the first end of each contacting element faces the inlet of the mixer.

2. The injection mixer of claim 1, the injection mixer situated within a pipe configured to conduct pipe fluid subsea and wherein the first end is upstream of the second end.

3. The injection mixer of claim 2, wherein for at least one of the contacting element(s), the at least one injection path comprises at least a first and second injection path, the first injection path configured to inject the first admixture fluid and the second injection path configured to inject a second admixture fluid.

4. The injection mixer of claim 3, wherein, for at least one of the contacting surface(s), the first injection path is configured to inject the first admixture fluid onto the contacting surface at a first location and the second injection path is configured to inject the second admixture fluid onto the contacting surface at a second location that is closer to the second end than is the first location.

5. The injection mixer of claim 2, wherein each of the contacting element(s) comprises a conical ring such that the mixing channel(s) comprise:
    an outer mixing channel comprising a frustoconical annulus having a central axis coaxial with a central axis of the pipe and a first cross-section that is disposed at the first end and a second cross-section that is disposed at the second end and is larger than the first-cross section; and
    a frustoconical inner mixing channel having a central axis coaxial with the central axis of the pipe.

6. The injection mixer of claim 2, wherein the contacting element(s) comprise a plurality of contacting elements positioned over the cross-section of the pipe, wherein for each of the contacting elements the mixing channel(s) comprise a frustoconical mixing channel.

7. The injection mixer of claim 2, wherein for at least one of the contacting element(s), at least one of the contacting surface(s) forms a cone having a central axis coaxial with a central axis of the pipe and a first cross-section that is at the first end and a second cross-section that is at the second end and is smaller than the first cross-section such that the mixing channel comprises a frustoconical annulus.

8. A method of using the injection mixer of claim 2, comprising, for each of the mixing channel(s) of each of the contacting element(s):
    communicating the pipe fluid through the mixing channel from the first end to the second end; and
    injecting a first admixture fluid comprising a hydrate inhibitor through a first injection path of the at least one injection path such that the first admixture fluid flows onto the contacting surface and is entrained by the pipe fluid.

9. The method of claim 8, further comprising, for each of the mixing channel(s) of each of the contacting element(s), injecting a second admixture fluid through a second injection path of the at least one injection path such that the second admixture fluid flows onto the contacting surface and is entrained by the pipe fluid.

10. The method of claim 9, where the second admixture fluid comprises at least one of a corrosion inhibitor, a scale inhibitor, and a wax inhibitor.

11. The method of claim 9, wherein the first admixture fluid is glycol or methanol and the second admixture fluid is triazine.

12. The method of claim 8, wherein the injecting comprises adjusting an aperture of the first injection path, thereby adjusting the flow rate of the first admixture fluid.

13. The method of claim 9, wherein the injecting is performed such that the first admixture fluid is injected onto the contacting surface at a first location and the second admixture fluid is injected onto the contacting surface at a second location that is closer to the second end than is the first location.

* * * * *